US011087165B2

(12) United States Patent
Onoro-Rubio et al.

(10) Patent No.: US 11,087,165 B2
(45) Date of Patent: Aug. 10, 2021

(54) METHOD AND SYSTEM FOR CONTEXTUALIZING AUTOMATIC IMAGE SEGMENTATION AND REGRESSION

(71) Applicant: NEC Laboratories Europe GmbH, Heidelberg (DE)

(72) Inventors: Daniel Onoro-Rubio, Heidelberg (DE); Mathias Niepert, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 161 days.

(21) Appl. No.: 16/515,049

(22) Filed: Jul. 18, 2019

(65) Prior Publication Data
US 2020/0175306 A1 Jun. 4, 2020

Related U.S. Application Data

(60) Provisional application No. 62/772,675, filed on Nov. 29, 2018.

(51) Int. Cl.
*G06K 9/46* (2006.01)
*G06N 3/04* (2006.01)
*G06K 9/66* (2006.01)
*G06K 9/62* (2006.01)

(52) U.S. Cl.
CPC ......... *G06K 9/4604* (2013.01); *G06K 9/6256* (2013.01); *G06K 9/66* (2013.01); *G06N 3/04* (2013.01)

(58) Field of Classification Search
None
See application file for complete search history.

(56) References Cited

U.S. PATENT DOCUMENTS

| 9,865,042 | B2 | 1/2018 | Dai et al. |
| 10,096,125 | B1* | 10/2018 | Yang ................ G06T 7/74 |
| 10,657,376 | B2* | 5/2020 | Lee ................ G06K 9/4604 |
| 2018/0130203 | A1 | 5/2018 | Abedini et al. |

(Continued)

FOREIGN PATENT DOCUMENTS

WO WO 2018052586 A1 3/2018

OTHER PUBLICATIONS

Olaf Ronneberger, et al., "U-Net: Convolutional Networks for Biomedical Image Segmentation", arXiv:1505.04597v1 [csCV], May 18, 2015, pp. 1-8.

(Continued)

*Primary Examiner* — Vikkram Bali
(74) *Attorney, Agent, or Firm* — Leydig, Voit & Mayer, Ltd.

(57) ABSTRACT

Systems and methods for contextualizing automatic image segmentation and/or regression including defining an hourglass neural network model, which includes defining an encoder configured to generate compression layers, including a bottleneck layer, and defining a decoder including a contextual convolution operation and configured to generate one or more reconstruction layers. The contextual convolution operation includes establishing, for each of the one or more reconstruction layers, a skip connection between the reconstruction layer and prior layer(s) of different spatial dimension, e.g., between the bottleneck layer and the reconstruction layer and/or between reconstruction layers.

13 Claims, 7 Drawing Sheets

(56) References Cited

U.S. PATENT DOCUMENTS

2018/0165551 A1 6/2018 Roh et al.

OTHER PUBLICATIONS

Kaiming He, et al., "Deep Residual Learning for Image Recognition", arXiv:1512.03385v1 [cs.CV], Dec. 10, 2015, pp. 1-12.
Fausto Milletari, et al., "V-Net: Fully Convolutional Neural Networks for Volumetric Medical Image Segmentation", arXiv:1606.04797v1 [cs.CV], Jun. 15, 2016.
Yading Yuan, et al., "Automatic skin lesion segmentation with fully convolutional-deconvolutional networks", arXiv:1703.05165v2 [cs.CV], Sep. 28, 2017, pp. 1-4.
Daniel Onoro-Rubio, et al., "Contextual Hourglass Networks for Segmentation and Density Estimation", $1^{st}$ Conference on Medical Imaging with Deep Learning (MIDL 2018), Dec. 2018, pp. 1-3.
Yu Liu, et al., "Hourglass-ShapeNetwork Based Semantic Segmentation for High Resolution Aerial Imagery", Remote Sens., vol. 9, Dec. 2017, pp. 1-24.
Hao Chen, et al., "DCAN: Deeo Contour-Aware Netowkr sfor Accurate Gland Segmentation", arXiv:1604.02677v1 [csCV], Apr. 10, 2016, pp. 1-10.
Emmanuel Maggiori, et al., "High-Resolution Semantic Labeling with Convolutional Neural Networks", HAL archives-ouvertes, Mar. 14, 2017, pp. 1-14.
Li Zhang, et al., "End-to-End Learning of Multi-Scale Convolutional Neural Network for Stereo Matching", Proceedings of Machine Learning Research, vol. 95, Dec. 2018, pp. 81-96.
Jeremy Jordan, "An overview of semantic image segmentation", Data Science, May 21, 2018, pp. 1-21.

\* cited by examiner

METHOD AND SYSTEM FOR CONTEXTUALIZING AUTOMATIC IMAGE SEGMENTATION AND REGRESSION

CROSS REFERENCES TO RELATED APPLICATIONS

The present application claims priority to U.S. Provisional Patent Application Ser. No. 62/772,675 filed Nov. 29, 2018, which is hereby incorporated by reference in its entirety for all purposes herein.

STATEMENT REGARDING SPONSORED RESEARCH

The project leading to this application has received funding from the European Union's Horizon 2020 research and innovation program under grant agreement No 761508.

FIELD

Embodiments relate to methods and systems for contextualizing automatic image segmentation and regression.

BACKGROUND

Automatic image segmentation is the process of dividing an image into a set of segments that overlaps with the target objects. As an example, given an image of a microscope tissue which can contain tumor and healthy tissue, the goal is to draw a pixel-wise mask that separates and classifies both tissues. Automatic image regression is the task in which given an image, the system will predict a regression map of continuous values. Examples of such kinds of tasks are density maps for object counting and image auto-encoders. The top performing systems for automatic image segmentation and image regression are based on hourglass neural networks.

Hourglass neural networks are deep learning models which include two parts: an encoder and a decoder. The encoder takes the input information and compresses it towards the bottleneck. During the encoding process, the receptive field is increased, hence every tensor bin of the bottleneck will contain a large context (or area) from the input. The decoder takes the information, which has been compressed, and decodes it by spatially reconstructing the output of the network.

As a deep neural network, an hourglass network suffers from a problem of vanishing gradients that makes a learning signal become weak toward the input (see, e.g., U.S. Pat. No. 9,865,042, the entire contents of which are hereby incorporated by reference herein), which results in the bottom layers learning significantly slower, and makes the training substantially harder. To address this problem, neural networks architectures are provided by skip connections—see He, Kaiming et al., "Deep Residual Learning for Image Recognition," 2016 IEEE Conference on Computer Vision and Pattern Recognition 770-778 (2016) (the entire contents of which are hereby incorporated by reference herein)—that connect the bottom layers with the top layers, such as in U-Net—O. Ronneberger, P. Fischer, T. Brox, "U-Net: Convolutional Networks for Biomedical Image Segmentation," MICCAI. (2015) (the entire contents of which are hereby incorporated by reference herein)—or V-Net—Fausto Milletari, Nassir Navab, Seyed-Ahmad Ahmadi, "V-Net: Fully Convolutional Neural Networks for Volumetric Medical Image Segmentation," ArXiv: 1606.04797 (2016) (the entire contents of which are hereby incorporated by reference herein). In U-Net, just the layers with the same shape or dimension are connected, which only partially addresses the problem. However, the bottleneck does not have any skip-connection, ending up in a slower learning capability.

SUMMARY

An embodiment of the present invention provides a method for contextualizing automatic image segmentation and/or regression, the method including defining an hourglass neural network model, which includes defining an encoder configured to generate layers, including a bottleneck layer; and defining a decoder including a contextual convolution operation and configured to generate one or more reconstruction layers. The contextual convolution operation includes establishing, for each of the one or more reconstruction layers, a skip connection between the bottleneck layer and the reconstruction layer. The method may also include receiving or acquiring a dataset, and training the hourglass neural network model using the dataset.

BRIEF DESCRIPTION OF THE DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments will become apparent by reading the following detailed description with reference to the attached drawings which illustrate the following.

DETAILED DESCRIPTION

Figure 1:
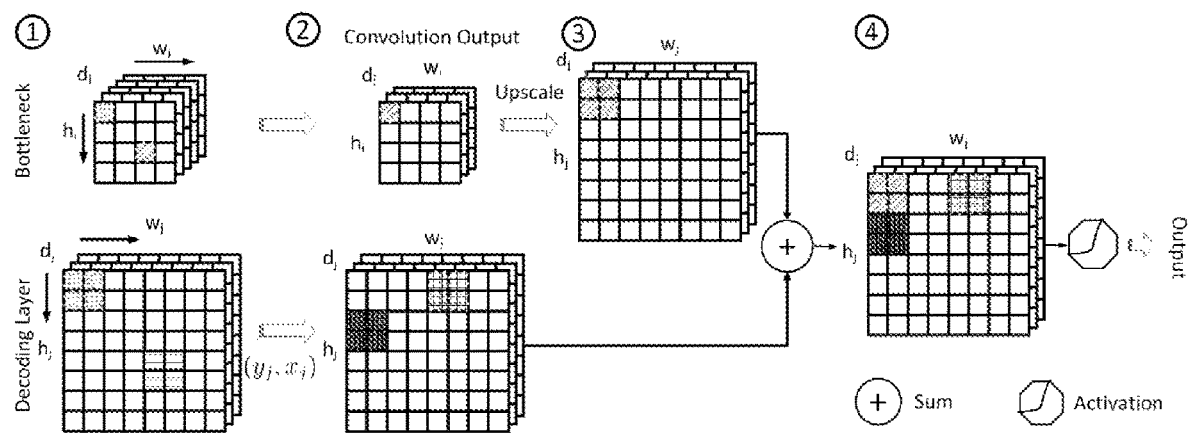
FIG. 1 illustrates an embodiment of a contextual convolution implementation diagram.

Embodiments of the present invention provide a mechanism to contextualize automatic image segmentation and/or regression. The embodiments advantageously solve the problem of vanishing gradients of hourglass neural networks and enhance the reconstruction information with contextual information. Accordingly, embodiments of the present invention provide an improved hourglass neural network that may be easier to train and has a substantially improved system performance.

In an embodiment, a method includes defining an hourglass neural network model, which includes defining an encoder configured to generate layers, including a bottleneck layer, and defining a decoder including a contextual convolution operation and configured to generate one or more reconstruction layers. The contextual convolution operation includes establishing, for each of the one or more reconstruction layers, a skip connection between the bottleneck layer and the reconstruction layer. The method may also include receiving or acquiring a dataset, and training the hourglass neural network model using the dataset.

In an embodiment, a system for contextualizing automatic image segmentation and/or regression includes one or more processors, and a memory storing code or instructions, which when executed by the one or more processors, causes the one or more processors to define an hourglass neural network model, which comprises an encoder configured to generate a plurality of layers, including a bottleneck layer, and a decoder including a contextual convolution operation and configured to generate one or more reconstruction layers. The contextual convolution operation includes establishing, for each of the one or more reconstruction layers, a skip connection between the bottleneck layer and the reconstruction layer. The code or instructions may also cause the one or more processors to receive or acquire a dataset, and train the hourglass neural network model using the dataset.

In an embodiment, a non-transitory, computer-readable medium is provided that has instructions stored thereon which, upon execution by one or more processors, provide for execution of a method comprising defining an hourglass neural network model, which comprises an encoder configured to generate a plurality of layers, including a bottleneck layer, and a decoder including a contextual convolution operation and configured to generate one or more reconstruction layers. The contextual convolution operation includes establishing, for each of the one or more reconstruction layers, a skip connection between the bottleneck layer and the reconstruction layer. The method may also include receiving or acquiring a dataset, and training the hourglass neural network model using the dataset In an embodiment, the contextual convolution operation further includes establishing, for each of the one or more reconstruction layers, one or more additional skip connections between the reconstruction layer and any or all prior reconstruction layer(s).

In an embodiment, the contextual convolution operation includes merging information from layers with different receptive fields.

In an embodiment, the contextual convolution operation receives as its input two (or more) features maps having different spatial dimensions.

In an embodiment, the two features maps are feature maps coming from a first layer and a second layer, the first layer having a larger receptive field than the second layer.

In an embodiment, the contextual convolution operation is a non-linear activation function.

In an embodiment, a method may include deploying the trained hourglass neural network model using as an input an image or dataset representing an image.

In an embodiment, the dataset includes data representing a plurality of images.

In an embodiment, the contextual convolution operation is applied from the bottleneck layer to at least one reconstruction layer.

In an embodiment, the contextual convolution operation the contextual convolution operation further includes establishing, for a reconstruction layer, a skip connections between the reconstruction layer and a compression layer having a same spatial dimension.

In embodiments of the present invention, a contextual convolution operation is used to create novel connections between a bottleneck and reconstruction layers while at the same time enhancing the reconstruction. Therefore, the embodiments of the present invention do at least two things: (1) create shorter paths from the output towards the bottleneck, substantially increasing the bottleneck learning capability; and (2) enhance the reconstruction: the contextual convolution is an operation that takes features maps of two layers as input, where one of the layers is a layer with a larger receptive field (context) than the other layer.

According to an embodiment, a method is provided for contextualizing automatic image segmentation and/or regression, the method including: (1) receiving (and/or accessing) a formatted data set, the formatted data set may include a segmentation data set and/or a regression data set; (2) defining a model; (3) training a model; and (4) deploying the model. The segmentation data set may include an input for training as tuples of (image, class masks). The regression data set may include the input as (image, regression map). For the case of an auto-encoder, the input can be just the image.

According to another embodiment, a system is provided for contextualizing automatic system segmentation and/or regression, the system including at least one processor and a memory coupled to the at least one processor, the memory having processor executable instructions that when executed cause the at least one processor to: (1) receive (and/or access) a formatted data set, the formatted data set may be a segmentation data set and/or a regression data set; (2) define a model (or instantiate a predefined model); (3) train the model; and (4) deploy the model.

According to an embodiment, the step of defining the model may include: defining a model having a contextual convolution as a mechanism and its implementation to merge information from layers with different receptive fields; and/or defining a model having a new type of hourglass architecture that solves the problem of vanishing gradients in the bottleneck while improving the encoder by enhancing the reconstruction process with contextual information.

Embodiments of the present invention can be applied to, for example, image segmentation, such as tumor tissue segmentation of a medical image, scene segmentation (e.g., for autonomous driving), and image regression, such as autoloader or density estimation for counting objects; however, the embodiments are not limited to these applications.

Defining a model includes: defining an encoder and defining a decoder. In an embodiment, the encoder is defined using sets of convolution operations and/or down-sampling operations. In an embodiment, the decoder is defined by up-sampling operations (e.g., with transpose convolutions) and/or contextual convolution operations.

FIG. 1 illustrates a contextual convolution operation according to an embodiment. A contextual convolution is a new type of operation that takes as input two features maps: $Cntxconv(X^l, X^{l+s}) = \alpha(\Sigma X_i^l + \Sigma X_j^{l+s})$ where $X^l$ are the feature maps coming from a layer 1 with a larger receptive field and $X^{l+s}$ are the features of another layer (l+s) with a smaller receptive field, and $\alpha(\bullet)$ is a non-linear activation function.

To efficiently implement the contextual convolution operation, in an embodiment, the operation may be decomposed into a linear convolution, which is applied to $X^l$, then an up-sampling operation (e.g., nearest neighbor or bilinear interpolation), a linear convolution on $X^{l+s}$, the summation of the up-samples responses of the linear convolution of $X^l$ and the responses of the linear convolution of $X^{l+s}$, and apply the non linearity. In an embodiment, therefore: $Cntxconv(X^l, X^{l+s}) = \alpha(up(convX_i^l) + conv(X_j^{l+s}))$.

Figure 2:
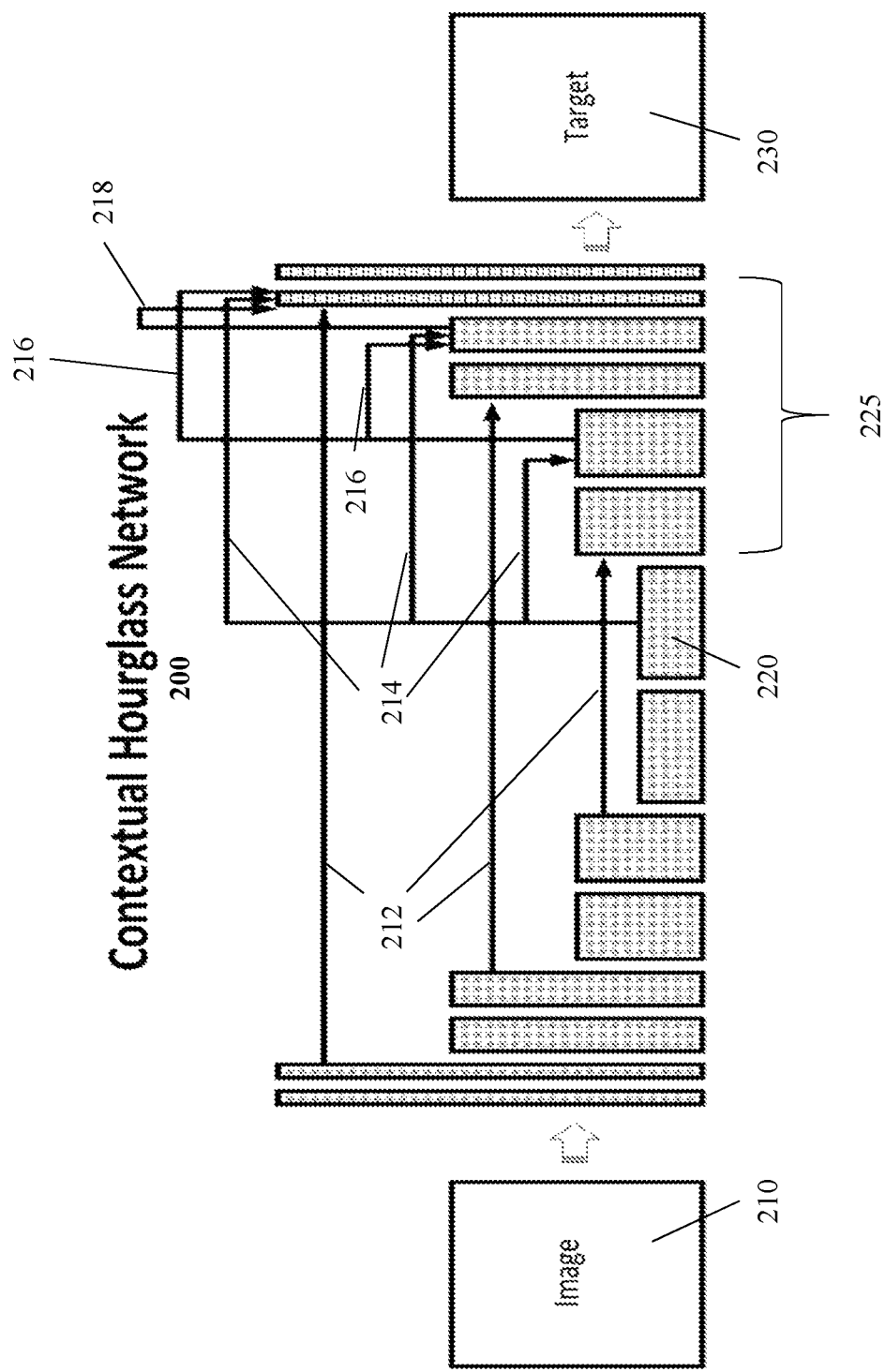
FIG. 2 illustrates a contextual hourglass network process workflow diagram, including skip connections, according to embodiments.

The contextual convolution operation is a novel operation that enables the creation of new and robust models such as depicted in FIG. 2, which illustrates a contextual hourglass network 200 according to an embodiment. The described mechanism may be applied from the bottleneck 220 to each of the reconstruction layers 225. For example, every reconstruction layer has a skip connection to a superior reconstruction layer. The decoding part is densely connected with the bottleneck 220 and each of the layers with a larger receptive field.

In the contextual hourglass network 200 an input image 210 is received and processed to produce a target file 230, which may be an image, a modified image, data representing information in the received input image, a density map, regression information, segmentation information, etc.

In an embodiment, input image 210 is processed by the encoder portion to generate one or a plurality of layers (e.g., compression layers), and a bottleneck layer 220. The decoder portion generates one or more reconstruction layers 225. In FIG. 2, three reconstruction layers are shown, but one skilled in the art will readily understand that one or two, or more than three reconstruction layers may be generated. In an embodiment, the contextual convolution operation includes establishing, for each of the one or more reconstruction layers 225, a skip connection 214 between the bottleneck layer 220 and the reconstruction layer. In another embodiment, the contextual convolution operation further includes establishing, for each of the one or more reconstruction layers 225, one or more additional skip connections between the reconstruction layer and a prior reconstruction layer, e.g., skip connections may be added between all reconstruction layers.

In the example shown in FIG. 2, the first reconstruction layer includes a skip connection 214 to the bottleneck layer 220, the second reconstruction layer includes a skip connection 214 to the bottleneck layer 220 and a skip connection 216 to the first reconstruction layer, and the third reconstruction layer includes a skip connection 214 to the bottleneck layer 220, a skip connection 216 to the first reconstruction layer, and a skip connection 218 to the second reconstruction layer In these embodiments, the contextual convolution operation ties the filter maps of two layers whose features maps have different spatial dimensions, e.g., skip connections between layers with different shapes.

Also shown in FIG. 2 are (e.g., U-Net) skip connections 212 between feature maps with the same spatial dimension, e.g., output feature maps of layers that mirror each other relative to the bottleneck 220, according to an embodiment.

Segmentation

An example embodiment was evaluated on the ISIC 2017: Skin Lesion Analysis Towards Melanoma Detection. The dataset consists of 2750 RGB images of skin lesion, with a variable image size. The dataset is split into a training set of 2000 images, a validation set of 150 and a test set with 600 images. The annotated ground truth corresponds to the mask areas that cover the lesion. An embodiment of the contextual hourglass network according to the present disclosure was compared with the winner of a challenge discussed in Yading Yuan, "Automatic skin lesion segmentation with fully convolutional-deconvolutional networks," ArXiv: 1703.05165 (2017) (the entire contents of which are hereby incorporated by reference herein) and U-Net, which was used as the baseline.

The contextual hourglass network and the U-Net were trained within the same conditions. All the weights were randomly initialized with the Xavier method. During the training, the categorical cross entropy loss and the DICE coefficient loss were optimized. The training strategy consisted of two parts. In the first part, the models were trained on augmented data by performing randomly distortions. In the second step, the models were fine tuned for the nondistorted data. On each part the models were trained until convergence.

Table 1 lists the results. The contextual hourglass network significantly outperformed the other networks showing that the contextual convolutions lead to a significant improvement.

TABLE 1

Experimental results for the ISBI 2012 challenge.

| Method | Accuracy | DICE Coefficient | Jaccard Index |
| --- | --- | --- | --- |
| Prior Challenge Winner | 0.9340 | 0.8490 | 0.7650 |
| U-Net | 0.8927 | 0.8732 | 0.7784 |
| Contextual Hourglass | 0.8980 | 0.8818 | 0.7913 |

Figure 3:
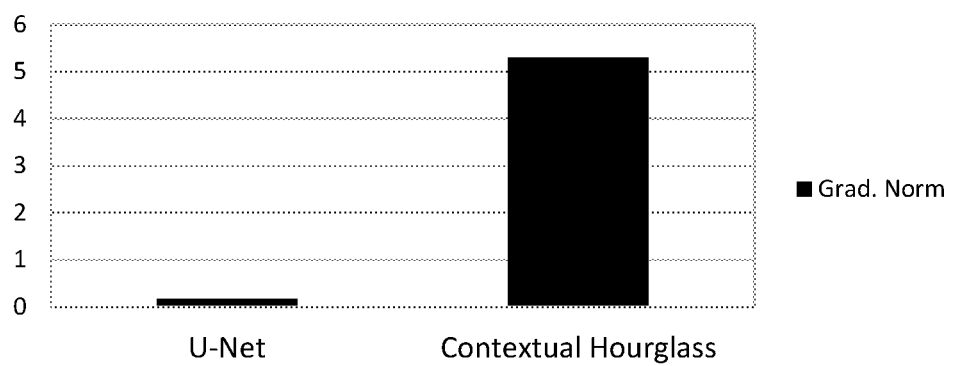
FIG. 3 illustrates a mean of the norms of gradients on a bottleneck of U-Net and a contextual hourglass system according to an embodiment.

FIG. 3 shows the improvement on the gradients at the bottleneck (showing the mean of norms of the gradients on the bottleneck of the U-NET and an embodiment of the present invention). An embodiment of the contextual hourglass network of the present disclosure was compared with respect to the U-Net baseline. Both network models were fed with exactly the same sequence of images and trained for a few iterations. The gradients were computed and averaged over all the iterations. The contextual hourglass mechanism of the present disclosure efficiently and substantially increased the norm of the gradients arriving at the bottleneck.

Object Counting

An example embodiment was evaluated using the counting by regression problem of a publicly available dataset, TRANCOS, which includes images depicting traffic jams in various road scenarios, under multiple lighting conditions and different perspectives. The TRANCOS dataset provides 1,244 images obtained from video surveillance cameras where a total of 46,796 vehicles have been annotated. The dataset comes with a training split of 403 images, a validation set of 420 and a test set of 421, and also includes a region of interest (ROI) per image. The dataset comes with the Grid Average Mean absolute Error (GAME) metric which is used to perform the evaluation. According to this metric, each image is divided into a set of $4^s$ non-overlapping rectangles. When s=0 it is the entire image, when s=1 it is the four quadrants, and so on. For a specific value of s, the GAME(s) is computed as the average of the MAE in each of the corresponding $4^s$ subregions. Let RS be the set of image regions resulting from dividing the image into $4^s$ non-overlapping rectangles. Then, the GAME(s) is obtained as shown in Table 2 which lists the results.

TABLE 2

Results - comparison of the proposed method and the state-of-the-art using the TRANCOS dataset.
TRANCOS

| Model | GAME 0 | GAME 1 | GAME 2 | GAME 3 |
| --- | --- | --- | --- | --- |
| Reg. Forest | 17.77 | 20.14 | 23.65 | 25.99 |
| MESA | 13.76 | 16.72 | 20.72 | 24.36 |
| Hydra 3s | 10.99 | 13.75 | 16.69 | 19.32 |
| CSRNet | 3.56 | 5.49 | 8.57 | 15.04 |
| Patent | 6.93 | 8.60 | 10.21 | 12.12 |

The present embodiments, and variations thereof, may be implemented in a variety of applications.

Figure 4:
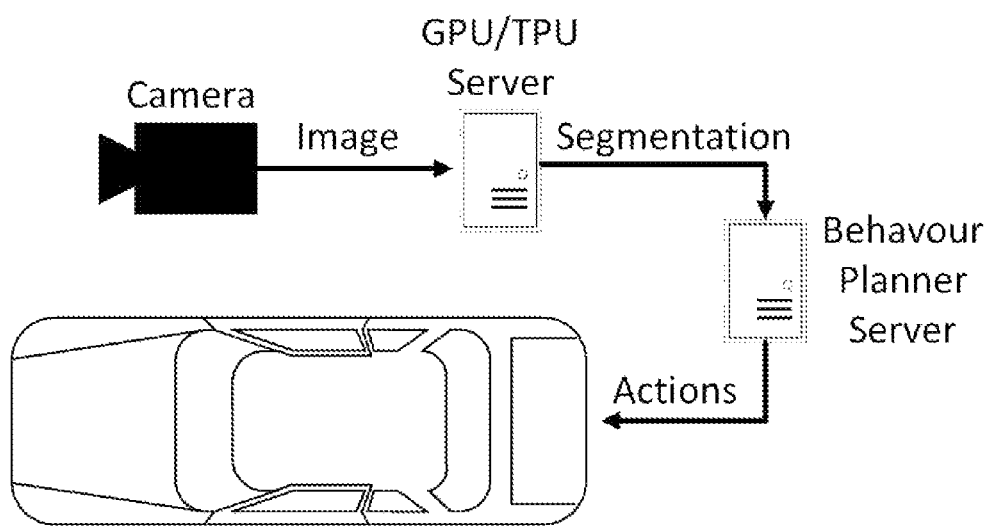
FIG. 4 illustrates an example of an unmanned ground vehicle image segmentation system.

For example, FIG. 4 illustrates an example embodiment in an unmanned ground vehicle system. In this embodiment, image segmentation may be used. In autonomous navigation, a core task of most of the autonomous vehicles is semantic segmentation. Typically autonomous vehicles are provided with video cameras that provide a video stream of the driving. Each image may be segmented, i.e. the different part of the image such as the road, the sky, sidewalks, building, cars, pedestrian and other objects are extracted. This information is especially useful to define the behavior of the vehicle during the driving. A camera installed in the autonomous vehicle captures images during the driving. A GPU/TPU server segments those images. The segmentation results are sent to the behavior planner (e.g., autonomous driving control system) which post-process the segmentation results and sends actions to the car or controls actions of the car. Using a contextual hourglass network of the present embodiments in this system provides improvements over the state of the art.

Figure 5:
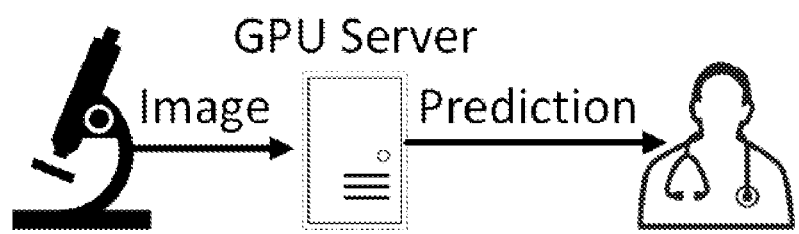
FIG. 5 illustrates an example of a medical image segmentation system.

In another example, an embodiment may be used for medical image segmentation. FIG. 5 illustrates an example medical image segmentation system using a contextual hourglass network of the present embodiments. Here, an image is extracted from a microscope or other sensor, and the image is processed according to an hourglass neural network model of the present invention. Finally, the specialist assisted by the presented results will take any actions that are needed. In particular for tissue segmentation, given a tissue image, embodiments of the present invention automatically and precisely segment different tissues such as cancerous tissue from healthy tissue, which leads toward a faster and more precise prognosis and treatment efficacy.

Figure 6:
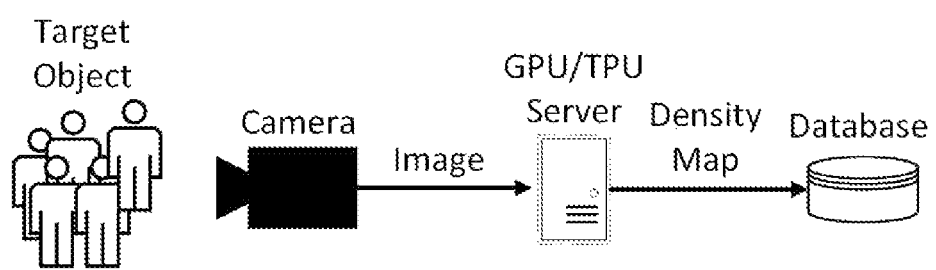
FIG. 6 illustrates an example of an image regression system.

Another embodiment may be deployed for image regression. For example, such as the system of FIG. 6, which is for object counting. In object counting, the object counting is the problem in which, given an input image, a density map is generated which encodes the amount of objects on it. For example, a camera observes a scene which contains a crowd. Then a GPU/TPU server process the images by executing an hourglass neural network model of the present invention and produces the density maps. Thereafter, those density maps can be stored in a database server or post-processed for another downstream task.

Figure 7:
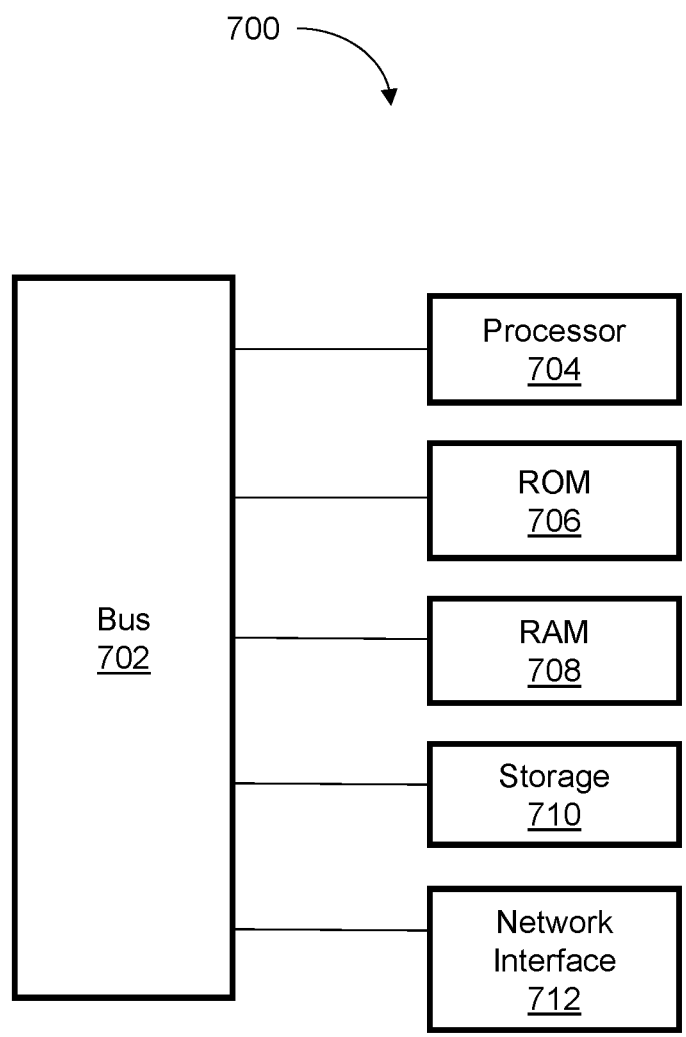
FIG. 7 is a block diagram of a processing system according to an embodiment.

FIG. 7 is a block diagram of a processing system according to an embodiment. The processing system 700 can be used to implement the protocols, devices, mechanism, systems and methods described above. The processing system 700 includes a processor 704, such as a central processing unit (CPU) of a computing device or a distributed processor system. The processor 704 executes processor executable instructions for performing the functions and methods described above. In embodiments, the processor executable instructions are locally stored or remotely stored and accessed from a non-transitory computer readable medium, such as storage 710, which may be a hard drive, cloud storage, flash drive, etc. Read Only Memory (ROM) 706 includes processor executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet, and may be used to receive and/or transmit data, including datasets such as datasets representing one or more images.

While embodiments have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for contextualizing automatic image segmentation and/or regression, the method comprising:
    defining an hourglass neural network model, which comprises:
        an encoder configured to generate a bottleneck layer; and
        a decoder including a contextual convolution operation configured to generate one or more reconstruction layers, wherein the contextual convolution operation includes establishing, for each of the one or more reconstruction layers, a skip connection between the bottleneck layer and the reconstruction layer, wherein the contextual convolution operation receives as input two features maps having different spatial dimensions; and
    receiving or acquiring a dataset; and
    training the hourglass neural network model using the dataset.

2. The method of claim 1, further comprising deploying the trained hourglass neural network model using an input image or dataset representing an image.

3. The method of claim 1, wherein the contextual convolution operation includes merging information from layers with different receptive fields.

4. The method of claim 1, wherein the contextual convolution operation is applied from the bottleneck layer to at least one reconstruction layer.

5. The method of claim 1 wherein the contextual convolution operation is a non-linear activation function.

6. The method of claim 1 wherein the two features maps are feature maps coming from a first layer and a second layer, the first layer having a larger receptive field than the second layer.

7. The method of claim 1, wherein the dataset includes data representing a plurality of images.

8. The method of claim 1, wherein the contextual convolution operation further includes establishing, for each of the one or more reconstruction layers, one or more skip connections between the reconstruction layer and a prior reconstruction layer.

9. A system for contextualizing automatic image segmentation and/or regression, the system comprising:
   one or more processors; and
   a memory storing code, which when executed by the one or more processors, cause the one or more processors to:
   define an hourglass neural network model, which comprises:
      an encoder configured to generate a bottleneck layer; and
      a decoder including a contextual convolution operation configured to generate one or more reconstruction layers, wherein the contextual convolution operation includes establishing, for each of the one or more reconstruction layers, a skip connection between the bottleneck layer and the reconstruction layer, wherein the contextual convolution operation receives as input two features maps having different spatial dimensions; and
   receive or acquire a dataset; and
   train the hourglass neural network model using the dataset.

10. The system of claim 9, wherein the contextual convolution operation further includes establishing, for each of the one or more reconstruction layers, one or more skip connections between the reconstruction layer and a prior reconstruction layer.

11. The system of claim 9, wherein the contextual convolution operation includes merging information from layers with different receptive fields.

12. A non-transitory, computer-readable medium having instructions stored thereon which, upon execution by one or more processors, provide for execution of a method comprising:
   defining an hourglass neural network model, which comprises:
      an encoder configured to generate a bottleneck layer; and
      a decoder including a contextual convolution operation configured to generate one or more reconstruction layers, wherein the contextual convolution operation includes establishing, for each of the one or more reconstruction layers, a skip connection between the bottleneck layer and the reconstruction layer, wherein the contextual convolution operation receives as input two features maps having different spatial dimensions; and
   receiving or acquiring a dataset; and
   training the hourglass neural network model using the dataset.

13. The non-transitory, computer-readable medium of claim 12, wherein the contextual convolution operation further includes establishing, for each of the one or more reconstruction layers, one or more skip connections between the reconstruction layer and a prior reconstruction layer.

* * * * *